(12) United States Patent
Inoue et al.

(10) Patent No.: US 8,344,050 B2
(45) Date of Patent: Jan. 1, 2013

(54) PIPING MEMBER FORMED BY USING PROPYLENE-BASED RESIN COMPOSITION

(75) Inventors: Takanori Inoue, Nobeoka (JP); Hidehiro Kourogi, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 537 days.

(21) Appl. No.: 12/523,238

(22) PCT Filed: Feb. 1, 2008

(86) PCT No.: PCT/JP2008/052072
§ 371 (c)(1), (2), (4) Date: Jul. 15, 2009

(87) PCT Pub. No.: WO2008/099760
PCT Pub. Date: Aug. 21, 2008

(65) Prior Publication Data
US 2010/0035007 A1  Feb. 11, 2010

(30) Foreign Application Priority Data
Feb. 16, 2007 (JP) .................... 2007-036643

(51) Int. Cl.
*C08K 5/34* (2006.01)
*B29D 23/00* (2006.01)
(52) U.S. Cl. .................. 524/100; 428/36.9
(58) Field of Classification Search ............ 524/100
See application file for complete search history.

(56) References Cited

U.S. PATENT DOCUMENTS

| 5,256,734 | A |  | 10/1993 | Sugihara et al. |  |
|---|---|---|---|---|---|
| 5,824,759 | A |  | 10/1998 | Watanabe et al. |  |
| 5,922,811 | A |  | 7/1999 | Suzuki et al. |  |
| 5,962,595 | A |  | 10/1999 | Dolle et al. |  |
| 6,031,034 | A | * | 2/2000 | Morimoto et al. | 524/108 |
| 6,441,111 | B1 |  | 8/2002 | Ushioda et al. |  |
| 2002/0091191 | A1 |  | 7/2002 | Saito et al. |  |
| 2009/0082513 | A1 | * | 3/2009 | Kourogi et al. | 524/451 |

FOREIGN PATENT DOCUMENTS

| CN | 1076741 C |  | 12/2001 |
|---|---|---|---|
| JP | 5-105788 A |  | 4/1993 |
| JP | 6-179785 A |  | 6/1994 |
| JP | 8-199017 A |  | 8/1996 |
| JP | 10-53628 A |  | 2/1998 |
| JP | 2002-212364 A |  | 7/2002 |
| JP | 2002-295741 A |  | 10/2002 |
| JP | 2004-231891 A |  | 8/2004 |
| JP | 2004231891 A | * | 8/2004 |
| JP | 2006-83218 A |  | 3/2006 |
| JP | 2006-328300 A |  | 12/2006 |
| JP | 2007-39474 A |  | 2/2007 |
| JP | 2008-121030 A |  | 5/2008 |
| WO | WO 2006-078078 A1 |  | 7/2006 |
| WO | WO 2007/004706 A1 |  | 1/2007 |

OTHER PUBLICATIONS

Translation of JP2004-231891, Aug. 2004.*
Product data sheet of Tuftec H1062, 2012.*
International Search Report (PCT/ISA/210) for PCT/JP2008/052072 completed Apr. 10, 2008.

* cited by examiner

*Primary Examiner* — Hui Chin
(74) *Attorney, Agent, or Firm* — Buchanan Ingersoll & Rooney PC

(57) ABSTRACT

Disclosed are a piping member formed by using a propylene-based resin composition comprising 100 parts by mass of a propylene-ethylene random copolymer (A) having an ethylene content of 2 to 5%, a crystallization temperature of 86 to 105° C., a melt flow rate of 0.01 to 2.00 g/10 min and a molecular weight distribution of 3 to 8, and 1 to 15 parts by mass of a styrene-butadiene-base rubber (B) having a styrene content of 10 to 40% and a weight average molecular weight of 200,000 or more as essential components, a melt flow rate after kneading being from 0.01 to 2.00 g/10 min, characterized in that the propylene-based resin composition further comprising a hindered amine-based light stabilizer (C) having a weight average molecular weight of 2,000 or more in the amount of 0.1 to 1.0 parts by mass based on 100 parts by mass of the propylene-ethylene random copolymer; and a piping member formed by using a propylene-based resin composition, wherein the styrene-butadiene-base rubber is a hydrogenated styrene-butadiene block copolymer rubber.

2 Claims, No Drawings

PIPING MEMBER FORMED BY USING PROPYLENE-BASED RESIN COMPOSITION

TECHNICAL FIELD

The present invention relates to a piping member formed by using a propylene-based resin composition which is suited for use as piping members such as pipes produced by an extrusion molding method, and joints, flanges, valves and casings of actuators produced by an injection molding method. More particularly, the present invention relates to a piping member formed by using a propylene-based resin composition which has excellent high-temperature creep characteristics, a wide application temperature range with suppressed low-temperature brittleness, low elutability and inner surface smoothness.

BACKGROUND ART

Conventionally, a propylene-based resin composition has excellent characteristics such as rigidity, heat resistance and chemical resistance, and a piping member made of a propylene-based resin composition is widely used in various types of industrial installations and in the fields of medical care and construction. In particular, a pipe made of a propylene-based resin has chemical resistance to acid and alkali in a high-temperature range (60 to 95° C.) and has a low price, and is therefore suited as an industrial high-temperature piping member through which a chemical solution flows at a high temperature. Regarding such piping members for high temperature, conventional metal pipes tend to be replaced by resin pipes and also a propylene-based resin is candidate for the material of the pipe, and thus increased application is expected in the future. A resinous high-temperature piping member must withstand use over a long period while allowing liquid to flow at a high temperature of 95° C. (for example, when SDR (outer diameter/wall thickness) is 11, the piping member must not fail under a load of 0.4 MPa for 10 years). In order to meet these requirements, excellent high-temperature creep characteristics are required.

Previous proposed propylene-based resin compositions having improved high-temperature creep characteristics include a resin composition which has an ethylene content of 0.1 to 2% by weight, a melt flow index (the same as a melt flow rate) of 5 dg/m or less (corresponding to 5 g/10 min) and a molecular weight distribution of 6 to 20 (refer to Japanese Unexamined Patent Publication (Kokai) No. 10-53628). The high-temperature creep characteristics of this resin are in conformity with DIN 8078 (at 95° C. under a test stress of 3.5 N/mm$^2$) and satisfy a fracturing time of a piping member of 1,200 hours or more (2,000 or more hours in the highest numerical value) and a minimum fracturing time in accordance with DIN 8078 of 1,000 hours or more.

However, when the conventional resin composition is used as a high-temperature piping member through which a chemical solution at a high temperature flows over a long period, higher-temperature creep characteristics are required. Since the molecular weight distribution (hereinafter referred to as Mw/Mn) is within a wide range from 6 to 20 and Mw/Mn is within a wide range, a high level of low molecular weight components is contained. Therefore, in the fields of food, medical care and semiconductor production, in a piping line enclosing a flow of pure water or a chemical solution for which an elution of the piping member is extremely undesirable, there was a problem that a low molecular weight component is eluted into the fluid. Also there was a problem that, when the low molecular weight component is contained, the piping member is likely to deteriorate, resulting in deterioration of chemical resistance. Furthermore, there was a problem that, since low-temperature brittleness cannot be suppressed as a result of deterioration of impact resistance (refer to Comparative Example 8: corresponding to a conventional resin composition), when the piping member is used for outdoor piping in an environment where an outdoor winter temperature is −20° C. or lower, the fluid becomes frozen and expands when flow of the fluid is stopped, and thus the piping member may be fail.

Although there is a method in which an amount of a rubber component in a conventional resin composition increases so as to suppress low-temperature brittleness, since high-temperature creep characteristics deteriorate when the amount of the rubber component increases, it was difficult to simultaneously satisfy physical strength at high temperatures and low temperatures to thus obtain a piping member having a wide application temperature range even when only the amount of the rubber component is increased.

Another method of improving high-temperature creep characteristics includes a method in which 25 to 65% by weight of glass filaments having a length of 2 to 50 mm are mixed with 35 to 75% by weight of a matrix polymer having a melt flow rate of 50 g/10 min or more which is a modified propylene homopolymer or modified propylene-ethylene copolymer prepared by modifying an isotactic propylene homopolymer or a crystalline propylene-ethylene copolymer comprising a homopolymer moiety and an isotactic propylene-ethylene copolymer moiety with an unsaturated carboxylic acid or its anhydride, or a mixture of the modified propylene homopolymer or the modified propylene-ethylene copolymer with the unmodified propylene homopolymer or the unmodified propylene-ethylene polymer to give a long fiber-reinforced polypropylene resin composition, and then the long fiber-reinforced polypropylene resin composition is molded to obtain a molded article (refer to Japanese Unexamined Patent Publication (Kokai) No. 2002-212364).

The conventional resin composition has excellent high-temperature creep characteristics but contains long glass fibers. Therefore, when the resin composition is used as a piping material to be formed into a piping, long glass fibers may fall off into the fluid which flows through the piping. Also, there is a problem that glass may be attacked according to the kind of fluid flowing through the piping. Furthermore, there is a problem that a piping obtained by extrusion molding of the conventional resin composition is not suitable for use as a piping member since inner surface smoothness is deteriorated.

DISCLOSURE OF THE INVENTION

The present invention has been made so as to overcome the above drawbacks of the conventional propylene-based resin composition and an object thereof is to provide a piping member formed by using a propylene-based resin composition which has excellent high-temperature creep characteristics, a wide applicable temperature range with suppressed low-temperature brittleness, low elutability and inner surface smoothness.

The present inventors have intensively studied so as to develop a propylene-based resin blend composition having favorable properties described above and found that the above object can be achieved by a resin composition comprising a specific propylene-based resin and a specific styrene-butadiene-based rubber component as essential components, and thus the present invention has been completed.

The present invention relates to a piping member formed by using a propylene-based resin composition comprising 100 parts by mass of a propylene-ethylene random copolymer (A) having an ethylene content of 2 to 5%, a crystallization temperature of 86 to 105° C., a melt flow rate of 0.01 to 2.00 g/10 min and a molecular weight distribution of 3 to 8, and 1 to 15 parts by mass of a styrene-butadiene-base rubber (B) having a styrene content of 10 to 40% and a weight average molecular weight of 200,000 or more as essential components, a melt flow rate after kneading being from 0.01 to 2.00 g/10 min, characterized in that the propylene-based resin composition further comprises a hindered amine-based light stabilizer (C) having a weight average molecular weight of 2,000 or more in the amount of 0.1 to 1.0 parts by mass based on 100 parts by mass of the propylene-ethylene random copolymer, and also relates to a piping member formed by using the above propylene-based resin composition, wherein the styrene-butadiene-base rubber is a hydrogenated styrene-butadiene block copolymer rubber.

It is necessary that the ethylene content of the propylene-ethylene random copolymer (A) used in the propylene-based resin composition used in the piping member of the present invention is from 2 to 5%. The ethylene content is preferably 2% or more since good high-temperature creep characteristics are obtained by ethylene content, while the ethylene content is preferably 5% or less so as to use the propylene-ethylene random copolymer as a fluid at a high temperature while maintaining heat resistance and rigidity of the piping member. The ethylene content is most preferably abut 3% so as to satisfy well-balanced properties such as high-temperature creep characteristics, heat resistance and rigidity of the piping member. The ethylene content is more preferably within a range from 2.5 to 3.5% since almost the same physical properties as in the case of the ethylene content of 3% can be obtained.

It is necessary that a crystallization temperature of the propylene-ethylene random copolymer (A) of the present invention is from 86 to 105° C. Since the time required to cause crystallization is shortened when the crystallization temperature becomes higher, the crystallization temperature is preferably 105° C. or lower so as not to exert an adverse influence on a piping member such as joint, valve or the like by suppressing the occurrence of inner voids upon injection molding. Since rigidity and heat resistance deteriorate when the crystallization temperature becomes lower, the crystallization temperature is preferably 86° C. or higher so as to use for a fluid at a high temperature while maintaining heat resistance and rigidity of the piping member.

It is necessary that MFR of the propylene-ethylene random copolymer (A) of the present invention is from 0.01 to 2.00 g/10 min, and more preferably from 0.01 to 0.60 g/10 min. MFR is preferably 0.01 g/10 min or more so as to obtain good productivity of the propylene-based resin composition, preferably 2.00 g/10 min or less so as to obtain good high-temperature creep characteristics while suppressing drawdown in pulp molding, and is preferably 0.60 g/10 min or less since moldability is particularly excellent. Since the styrene-butadiene-based rubber (B) has a high molecular weight of 200,000 or more in terms of a weight average molecular weight, MFR cannot be measured alone. Furthermore, after kneading the propylene-ethylene random copolymer (A) with the styrene-butadiene-based rubber (B), MFR is preferably the same as or smaller than that before kneading, and preferably within the same range as that of the propylene-ethylene random copolymer (A). MFR is measured under the conditions of a test temperature of 230° C. and a test load of 2.16 kg in conformity with JIS K7210.

Mw/Mn of the propylene-ethylene random copolymer (A) of the present invention is preferably within a range from 3 to 8. When Mw/Mn is 2 or less, it is difficult to obtain a pipe having inner surface smoothness since Mw/Mn is too small. Therefore, Mw/Mn is preferably 3 or more so that an extrusion-molded pipe can stably obtain good inner surface smoothness without being influenced by an environmental temperature upon molding, and extrusion molding is easily carried out. In order to obtain good high-temperature creep characteristics and to suppress elution of an organic substance into a fluid, Mw/Mn is preferably 8 or less. Furthermore, in order to satisfy well-balanced performances such as inner surface smoothness of the pipe, ease of extrusion molding and elution of an organic substance (elution is effectively suppressed when Mw/Mn is lower), Mw/Mn is most preferably about 4 and it is possible to obtain nearly the same physical properties as those obtained when Mw/Mn is 4. In actual manufacturing, Mw/Mn is more preferably adjusted within a range from 3 to 5 in light of variation in a numerical value of the propylene-ethylene random copolymer (A).

The propylene-ethylene random copolymer (A) of the present invention can be produced by any method as long as physical properties described above are satisfied, or can be produced by mixing a propylene homopolymer component or a propylene-ethylene random copolymer component and a propylene-ethylene random copolymer component, each component being separately produced, using various mixers. The propylene-ethylene random copolymer can be produced through polymerization by a known polymerization method using a polymerization apparatus, such as a slurry polymerization method, a vapor phase polymerization method, a bulk polymerization method, or a combination of these polymerization methods in any of a batch-wise manner, a semi-continuous manner or a continuous manner. The propylene-ethylene random copolymer can be produced by multi-stage polymerization in which one or more polymerization apparatuses of different polymerization conditions are connected in series.

It is necessary that the styrene content of the styrene-butadiene-based rubber (B) used in the propylene-based resin composition of the present invention is from 10 to 40%. The styrene content of the styrene-butadiene-based rubber (B) is preferably 10% or more so as to suppress deterioration of high-temperature creep characteristics, impact resistance and low-temperature brittleness caused by too small or large styrene content and to obtain good high-temperature creep characteristics, good impact resistance and suppressed low-temperature brittleness. The styrene content is preferably 40% or less so as to obtain good compatibility and to obtain good high-temperature creep characteristics and good impact resistance and suppressed low-temperature brittleness. The styrene content is most preferably about 30% so as to obtain well-balanced high-temperature creep characteristics, low-temperature brittleness and impact resistance. Since the weight average molecular weight of 200,000 or more is largely influenced on an improvement in high-temperature creep characteristics when compared with the styrene content of the styrene-butadiene-based rubber (B), the styrene content can be within a wide range and the content capable of obtaining nearly the same physical properties as those obtained when the styrene content is 30% is more preferably within a range from 20 to 35%.

It is necessary that the weight average molecular weight of the styrene-butadiene-based rubber (B) of the present invention is 200,000 or more. When the propylene-ethylene random copolymer (A) is blended with the styrene-butadiene-based rubber having a weight average molecular weight of 200,000 or less, impact resistance is improved and low-temperature brittleness is suppressed. However, since high-temperature creep characteristics deteriorate, the weight average molecular weight is preferably 200,000 or more so as to obtain good high-temperature creep characteristics and impact resistance suited for use as a high-temperature piping member and to suppress low-temperature brittleness. When the weight average molecular weight of the styrene-butadiene-based rubber (B) is adjusted to a higher molecular weight, high-temperature creep characteristics are improved and thus there is no particular limitation on the upper limit of the weight average molecular weight. The weight average molecular weight is substantially about several millions, and preferably from 200,000 to 3,000,000, so that it does not become difficult to produce the styrene-butadiene-based rubber (B) as a result of an increase in the weight average molecular weight. It is preferred that MFR does not vary before and after kneading the propylene-ethylene random copolymer (A) with the styrene-butadiene-based rubber (B) or decreases when compared with MFR before kneading. In order to prevent an increase in MFR after kneading, it is necessary that the weight average molecular weight is 200,000 or more so as to increase the molecular weight of the styrene-butadiene-based rubber (B) so as to make it impossible to measure MFR since MFR can be decreased if the styrene-butadiene-based rubber (B) has too high molecular weight to measure MFR.

Any method and any catalyst can be used in the polymerization method and the polymerization catalyst of the styrene-butadiene-based rubber (B) of the present invention. In view of chemical resistance and weatherability when the styrene-butadiene-based rubber (B) is blended with the propylene-ethylene random copolymer (A), a hydrogenation rate is preferably close to 100%. Specifically, the hydrogenation rate is preferably 85% or more, more preferably 90% or more, and still more preferably 95% or more, in view of weatherability, heat resistance and chemical resistance.

It is necessary that the amount of the styrene-butadiene-based rubber (B) is from 1 to 15 parts by mass based on 100 parts by mass of the propylene-ethylene random copolymer (A) for the following reason. In order to obtain good high-temperature creep characteristics, inner surface smoothness and impact resistance and to suppress low-temperature brittleness, the amount is preferably 15 parts by mass or less. The composition can contain another polymer if the amount is the same as or less than that of the styrene-butadiene-based rubber (B) based on 100 parts by mass of the propylene-ethylene random copolymer (A).

It is preferable to blend a light stabilizer as a weathering agent with the propylene-based resin composition of the present invention, and a mixture of light stabilizers may be blended. The light stabilizer has the effect of trapping a radical generated by degradation of the resin composition due to ultraviolet rays and suppressing degradation. The light stabilizer includes, for example, a hindered amine-based light stabilizer. The hindered amine-based light stabilizer preferably has a weight average molecular weight of 2,000 or more. The weight average molecular weight is preferably 2,000 or more since elution of a fluid contacted with a piping member formed of a propylene-based resin composition is suppressed and vaporization of the hindered amine-based light stabilizer is prevented. When the average molecular weight of the hindered amine-based light stabilizer is adjusted to a higher molecular weight, since elution of the fluid is more suppressed, there is no particular limitation on the upper limit of the weight average molecular weight. The weight average molecular weight is preferably within a range from about 2,000 to 10,000 so as to make it possible to prevent deterioration of compatibility and dispersibility as a result of an increase in a melting point of a hindered amine-based light stabilizer caused by an increase in the average molecular weight, and to perform uniform dispersion. The weight average molecular weight is more preferably within a range from 2,000 to 5,000 so as to make it difficult to produce the hindered amine-based light stabilizer. The weight average molecular weight is suitably 2,000 or more so as to suppress elution to the fluid contacted with the piping member formed of the propylene-based resin composition. Examples of the hindered amine-based light stabilizer having a weight average molecular weight of 2,000 or more are preferably dibutylamine 1,3,5-triazine.N,N-bis(2,2,6,6-tetramethyl-4-piperidyl-1,6-hexamethylenediamine.N-(2,2,6,6-tetramethyl-4-piperidyl)butylamine polycondensate, poly[{6-(1,1,3-3-tetramethylbutyl)amino-1,3,5-triazin-1-,4-diyl}{(2,2,6,6-tetramethyl-4-piperidyl)imino}hexamethylene{(2,2,6,6-tetramethyl)-4-piperidyl)imino}] and N,N'-bis(3-aminopropyl)ethylenediamine-2,4-bis[N-butyl-N-(1,2,2,6,6-pentamethyl-4-piperidyl)amino]-6-chloro-1,3,5-triazine condensate, and dimethyl succinate-1-(2-hydroxyethyl)-4-hydroxy-2,2,6,6-tetramethylpiperidine polycondensate.

In the propylene-based resin composition used to form a piping member of the present invention, 0.1 to 1.0 parts by mass of a hindered amine-based light stabilizer having an weight average molecular weight of 2000 or more is blended with 100 parts by mass of a propylene-ethylene random copolymer (C) and then the piping member of the present invention is formed.

An ultraviolet absorber has the effect of absorbing ultraviolet rays at a wavelength of about 320 to 350 nm at which a resin composition is most to undergo degradation, and converting into harmless vibration or thermal energy to suppress degradation of the resin composition. Examples of the ultraviolet absorber are preferably benzophenone-, benzotriazole- and benzoate-based ultraviolet absorbers.

The propylene-based resin composition of the present invention can be optionally blended with an antioxidant. Examples of the antioxidant include phenol-, phosphorus- and sulfur-based antioxidants. The phenol-based antioxidant is preferred since it exerts an effect within a high temperature range and suppresses oxidation due to a molding temperature upon injection molding. The phosphorus-based oxidant is preferred since it serves as an auxiliary capable of suppressing conversion of a phenol-based antioxidant into a radical. The sulfur-based antioxidant is preferred since it exerts the effect in long-term heat resistance and suppresses oxidative degradation during use in a piping through which a fluid at about 95° C. flows over a long period. The phenol-based antioxidant, the phosphorus-based oxidant and the sulfur-based antioxidant can be used alone, but a synergistic effect can be exerted by using in combination. Thus, the antioxidant effect and long-term heat-resistant effect are improved and also sufficient effect can be obtained by decreasing the amount so as to prevent elution.

The phenol-based antioxidant is preferably blended in the amount of 0.05 to 1.00 part by mass based on 100 parts by mass of the propylene-ethylene random copolymer (A) and, for example, tetrakis[methylene-3-(3',5'-di-t-butyl-4'-hydroxyphenyl)propionate]methane is preferred as the phenol-based antioxidant. The phosphorus-based antioxidant is preferably blended in the amount of 0.05 to 1.00 part by mass based on 100 parts by mass of the propylene-ethylene random copolymer (A) and, for example, tris(2,4-di-t-butylphenyl) phosphite is preferred as the phosphorus-based antioxidant. The sulfur-based antioxidant is preferably blended in the amount of 0.05 to 1.00 part by mass based on 100 parts by mass of the propylene-ethylene random copolymer (A) and, for example, distearyl 3,3'-thiodipropionate is preferred as the sulfur-based antioxidant.

The propylene-based resin composition of the present invention can be optionally blended with an inorganic filler. The inorganic filler is preferably talc and a piping member formed of the propylene-based resin composition containing talc of the present invention is preferred since elongation in a longitudinal direction caused by heat expansion is suppressed, and also meandering of the pipe caused by heat expansion can be suppressed even when a high-temperature fluid is allowed to flow when the piping member is a pipe. Talc is preferred since it is not fibrous like a glass fiber and thus it may not fall off from the piping into the fluid and inner surface smoothness may not deteriorate. The amount of the inorganic filler to be blended with the propylene-based resin varies depending on the kind, combination and average particle diameter of the inorganic filler, but is preferably from 10 to 30 parts by mass. The amount is preferably 10 parts by mass or more in view of suppression of heat expansion, and is preferably 30 parts by mass or less in view of prevention of deterioration of chemical resistance and impact resistance.

It is possible to optionally blend flame retardants (halogen-based flame retardants such as chlorinated polyethylene, decabromodiphenylether, etc., phosphorous-based flame retardants such as tricresyl phosphate, etc., inorganic flame retardants such as aluminum hydroxide, etc.), lubricants (hydrocarbon-based lubricants such as liquid paraffin, etc., fatty acid lubricants such as stearic acid, etc., higher alcohol-based lubricants such as stearyl alcohol, etc., amide-based lubricants such as stearic acid amide, etc., metal soap-based lubricants such as calcium stearate, etc.), antistatic agents (non-ionic surfactants such as polyetheresteramide, etc., amphoteric surfactants such as carbobetain graft copolymer, etc.), nucleating agents (carboxylic acid metal salt-based nucleating agents such as sodium benzoate, etc., sorbitol-based nucleating agents such as dibenzylidene sorbitol, etc., phosphate ester-based nucleating agents such as sodium bis (4-t-butylphenyl) phosphate, etc.), antibacterial agents (inorganic antibacterial agents such as zeolite, etc., organic antibacterial agents such as 2-(4-thiazolyl)benzoimidazole, etc.), colorants (inorganic colorants such as titanium oxide, etc., organic colorants such as carbon black, etc.) and heavy metal deactivators (hydrazine-based heavy metal deactivators such as N-saliciloyl-N'-aldehydehydazine, N-saliciloyl-N'-acetyl-hydazine, etc., oxamide-based heavy metal deactivators such as N,N'-diphenyloxamide, etc.). The amount thereof varies depending on the kind of additive, and is preferably the amount which enables sufficient effect of additives without causing deterioration of physical properties of the composition. There is no particular limitation on a method of melt-kneading after blending described above. It is possible to obtain a propylene-based resin composition containing components dispersed therein uniformly by using a single screw extruder, a twin screw extruder, a kneader or the like.

There is no particular limitation on the piping member using the propylene-based resin composition of the present invention. Examples of the piping member include pipes and multi-layered pipes obtained by extrusion molding, and joints, flanges and casings of actuators obtained by injection molding.

The piping member produced by using the propylene-based resin composition of the present invention has the following excellent characteristics.

(1) It is possible to obtain a piping member which has excellent high-temperature creep characteristics and can be used over a long period while allowing flow of a liquid at a high temperature of 95° C.
(2) Deterioration or fracture does not occur even if a fluid is frozen at a low temperature.
(3) It is possible to use at a wide temperature range from a high temperature to a low temperature.
(4) The piping member has high weatherability during outdoor use since a hindered amine-based light stabilizer having a weight average molecular weight of 2,000 or more is blended, and also contain a small amount of a lower molecular weight component. Therefore, the amount of organic components or metal components eluted in a fluid is suppressed and the piping member can be used in the fields of food, medical care and semiconductor manufacturing where low elution is preferred.
(5) It is possible to improve a decrease in MFR after kneading and inner surface smoothness by blending a styrene-butadiene-based rubber having a weight average molecular weight of 200,000 or more.

BEST MODE FOR CARRYING OUT THE INVENTION

The present invention will be described in more detail below by way of Examples, but the present invention is not limited to only the Examples.

With respect to a piping member made of a polypropylene-based resin of the present invention, a pipe was formed and the performance thereof was evaluated by the following test methods.

(1) Tensile Test

In accordance with JIS K7113, a tensile test specimen was cut from the pipe made of a polypropylene-based resin and a tensile test was carried out under an atmosphere at 23±1° C., and then a tensile strength and a tensile modulus of elasticity were measured.

(2) Notched Izod Impact Test

In accordance with JIS K7110, a notched izod impact test specimen was cut from a pipe made of a propylene-based resin, and then a notched izod impact strength was measured under an atmosphere at 23±1° C. and 0±1° C., respectively.

(3) High-Temperature Creep Test

In accordance with DIN8078, to a pipe (1,000 m) made of a propylene-based resin, 95±1° C. and an internal pressure of 1.4 MPa (pipe thickness: 5.6 mm, an outer diameter: 32 mm, a pipe internal pressure corresponding to a test stress of 3.5 MPa was calculated by a Naday's equation of the formula 1) was applied) and the time required to cause breakage was measured.

$$\text{Pipe internal pressure} = (2 \times \text{pipe wall thickness} \times \text{test stress})/(\text{pipe external diameter} - \text{pipe wall thickness}) \quad \text{Formula 1}$$

(4) Elution Test

A cap made of propylene is welded to both ends of a pipe (1,000 mm) made of a propylene-based resin, followed by a degreasing cleansing treatment. Ultrapure water is charged and the space is filled with a nitrogen gas. After sealing with a Saran sheet, the pipe is put in a constant-temperature water bath at 80° C. After 24 hours, the pipe is taken out. After passing through the above steps, the total organocarbon (TOC) was measured by a TOC automatic measuring apparatus. A TOC elution amount remarkably varies depending on elution of an organic substance caused by deterioration of a polymer, or elution of an organic additive blended. Smaller values of this numerical value show excellent low elutability characteristics.

(5) Weatherability Test

Using the above tensile test specimen, a forced deterioration test was carried out by an outdoor exposure test (Weather-O-meter) of a xenon arc light source for 600 hours (irradiation time, irradiation energy: 135,000 kJ/m$^2$, corresponding to outdoor exposure for 6 months). A tensile elongation was measured and a change from a tensile elongation (500%) for 0 hour (exposure) was calculated as a retention rate. Higher values of this retention rate show excellent weatherability.

(6) Inner Surface Smoothness Test

A small piece of a pipe made of a polypropylene-based resin having a length of 500 mm under an atmosphere at 20° C. was taken out. A two-dimensional surface roughness of the pipe inside was measured using a roughness analyzer equipped with a diamond probe (tip diameter: 2 mm), and then an inner surface roughness Rz was calculated in terms of a ten-point average.

First, a pipe was formed from a propylene-based resin composition having a different formulation, and then mechanical properties of the pipe were evaluated.

EXAMPLE 1

100 Parts by mass of a propylene-ethylene random copolymer (ethylene content: 3.0%, MFR: 0.5, Mw/Mn=4, crystallization temperature: 101° C.), 7.5 parts by mass of a hydrogenated styrene-butadiene rubber (Taftek N504 manufactured by Asahi Chemical Industries Co., Ltd., styrene content: 30%, average molecular weight: 230,000), 0.2 part by mass of dibutylamine 1,3,5-triazine-N,N'-bis(2,2,6,6-tetramethyl-4-piperidyl-1,6-hexamethylenediamine)-N-(2,2,6,6-tetramethyl-4-piperidyl)butylamine polycondensate (CHIMASSORB2020 manufactured by Ciba Specialty Chemicals Co., Ltd., weight average molecular weight: about 3,000) as a hindered amine-based light stabilizer, 0.1 part by mass of tetrakis[methylene-3-(3',5'-di-t-butyl-4-hydroxyphenyl)propionate]methane (IRGANOX manufactured by Ciba Specialty Chemicals Co., Ltd.) as a phenol-based antioxidant, 0.2 part by mass of tris(2,4-di-t-butylphenyl)phosphate (IRGAFOS168 manufactured by Ciba Specialty Chemicals Co., Ltd.) as a phosphorus-based antioxidant and 0.2 part by mass of disteallyl 3,3'-thiodipropionate (IRGANOX PS-802 manufactured by Ciba Specialty Chemicals Co., Ltd.) as a sulfur-based antioxidant were blended, and then the blend was kneaded by a twin screw extruder and pelletized to produce a propylene-based resin composition having an MFR of 0.43 g/10 min. after kneading. The resultant resin composition was formed into a pipe made of a propylene-based resin (having a thickness of 5.6 mm and an outer diameter of 32 mm) at a cylinder temperature of 220° C. using a single screw extruder, and then a tensile test, a notched izod impact test, a high-temperature creep test, an elution test, a weatherability test and an inner surface smoothness test were carried out. The results are shown in Table 1.

EXAMPLE 2

100 Parts by mass of a propylene-ethylene random copolymer (ethylene content: 3.0%, MFR: 0.5, Mw/Mn=4, crystallization temperature: 101° C.), 6.7 parts by mass of a hydrogenated styrene-butadiene-based rubber (Taftek N504 manufactured by Asahi Chemical Industries Co., Ltd., styrene content: 30%, weight average molecular weight: 230,000), 27.4 parts by mass of talc (MICRO ACE P-4 manufactured by Nippon Talc Co., Ltd., average particle diameter: 4.6 μm) and the same light stabilizer and antioxidant as those in Example 1 were blended and the mixture was kneaded and pelletized. A propylene-based resin composition having NFR of 0.42 g/10 min. after kneading was formed into a pipe and then various evaluation tests were carried out. The results are shown in Table 1.

EXAMPLE 3

100 Parts by mass of a propylene-ethylene random copolymer (ethylene content: 3.0%, MFR: 0.5, Mw/Mn=4, crystallization temperature: 101° C.), 8.2 parts by mass of a hydrogenated styrene-butadiene-based rubber (Taftek N504 manufactured by Asahi Chemical Industries Co., Ltd., styrene content: 30%, weight average molecular weight: 230,000), 9.4 parts by mass of talc (MICRO ACE P-4 manufactured by Nippon Talc Co., Ltd., average particle diameter: 4.6 μm) and the same light stabilizer and antioxidant as those in Example 1 were blended and the mixture was kneaded and pelletized. A propylene-based resin composition having an MFR of 0.42 g/10 min. after kneading was formed into a pipe and then various evaluation tests were carried out. The results are shown in Table 1.

EXAMPLE 4

100 Parts by mass of a propylene-ethylene random copolymer (ethylene content: 3.0%, MFR: 0.5, Mw/Mn=4, crystallization temperature: 101° C.), 8.4 parts by mass of a hydrogenated styrene-butadiene-based rubber (Taftek N504 manufactured by Asahi Chemical Industries Co., Ltd., styrene content: 30%, weight average molecular weight: 230,000), 10.5 parts by mass of a propylene homopolymer (ethylene content: 0%, MFR: 0.5, Mw/Mn=4, crystallization temperature: 118° C.) and the same light stabilizer and antioxidant as those in Example 1 were blended and the mixture was kneaded and pelletized. A propylene-based resin composition having an MFR of 0.42 g/10 min. after kneading was formed into a pipe and then various evaluation tests were carried out. The results are shown in Table 1.

COMPARATIVE EXAMPLE 1

100 Parts by mass of a propylene homopolymer (ethylene content: 0%, MFR: 0.5, Mw/Mn=4, crystallization temperature: 118° C.), 7.5 parts by mass of a hydrogenated styrene-butadiene-based rubber (Taftek N504 manufactured by Asahi Chemical Industries Co., Ltd., styrene content: 30%, weight average molecular weight: 230,000) and the same light stabilizer and antioxidant as those in Example 1 were blended and the mixture was kneaded and pelletized. A propylene-based resin composition having an MFR of 0.44 g/10 min. after kneading was formed into a pipe and then various evaluation tests were carried out. The results are shown in Table 2.

COMPARATIVE EXAMPLE 2

100 Parts by mass of a propylene-ethylene random copolymer (ethylene content: 3.0%, MFR: 0.5, Mw/Mn=4, crystallization temperature: 101° C.) and the same antioxidants as that in Example 1 were blended and the mixture was kneaded and pelletized. A propylene-based resin composition having an MFR of 0.54 g/10 min. after kneading was formed into a pipe and then various evaluation tests were carried out. The results are shown in Table 2.

COMPARATIVE EXAMPLE 3

100 Parts by mass of a propylene-ethylene random copolymer (ethylene content: 3.0%, MFR: 0.5, Mw/Mn=4, crystallization temperature: 101° C.), 20.5 parts by mass of a hydrogenated styrene-butadiene-based rubber (Taftek N504 manufactured by Asahi Chemical Industries Co., Ltd., styrene content: 30%, weight average molecular weight: 230,000) and the same light stabilizer and antioxidant as those in Example 1 were blended and the mixture was kneaded and pelletized. A propylene-based resin composition having an MFR of 0.29 g/10 min. after kneading was formed into a pipe and then various evaluation tests were carried out. The results are shown in Table 2.

COMPARATIVE EXAMPLE 4

100 Parts by mass of a propylene-ethylene random copolymer (ethylene content: 3.0%, MFR: 0.5, Mw/Mn=4, crystallization temperature: 101° C.), 7.5 parts by mass of a hydrogenated styrene-butadiene-based rubber (Taftek H1062 manufactured by Asahi Chemical Industries Co., Ltd., styrene content: 18%, weight average molecular weight: 100,000) and the same light stabilizer and antioxidant as those in Example 1 were blended and the mixture was kneaded and pelletized. A propylene-based resin composition having an MFR of 0.56 g/10 min. after kneading was formed into a pipe and then various evaluation tests were carried out. The results are shown in Table 2.

COMPARATIVE EXAMPLE 5

100 Parts by mass of a propylene-ethylene random copolymer (ethylene content: 6.0%, MFR: 0.5, Mw/Mn=4, crystallization temperature: 84° C.), 7.5 parts by mass of a hydrogenated styrene-butadiene-based rubber (Taftek N504 manufactured by Asahi Chemical Industries Co., Ltd., styrene content: 30%, weight average molecular weight: 230,000) and the same light stabilizer and antioxidant as those in Example 1 were blended and the mixture was kneaded and pelletized. A propylene-based resin composition having an MFR of 0.42 g/10 min. after kneading was formed into a pipe and then various evaluation tests were carried out. The results are shown in Table 2.

COMPARATIVE EXAMPLE 6

100 Parts by mass of a propylene-ethylene random copolymer (ethylene content: 3.0%, MFR: 0.5, Mw/Mn=9, crystallization temperature: 84° C.), 7.5 parts by mass of a hydrogenated styrene-butadiene-based rubber (Taftek N504 manufactured by Asahi Chemical Industries Co., Ltd., styrene content: 30%, weight average molecular weight: 230,000) and the same light stabilizer and antioxidant as those in Example 1 were blended and the mixture was kneaded and pelletized. A propylene-based resin composition having an MFR of 0.4 g/10 min. after kneading was formed into a pipe and then various evaluation tests were carried out. The results are shown in Table 2.

COMPARATIVE EXAMPLE 7

100 Parts by mass of a propylene-ethylene random copolymer (ethylene content: 3.0%, MFR: 0.5, Mw/Mn=2, crystallization temperature: 84° C.), 7.5 parts by mass of a hydrogenated styrene-butadiene-based rubber (Taftek N504 manufactured by Asahi Chemical Industries Co., Ltd., styrene content: 30%, weight average molecular weight: 230,000) and the same light stabilizer and antioxidant as those in Example 1 were blended and the mixture was kneaded and pelletized. A propylene-based resin composition having an MFR of 0.42 g/10 min. after kneading was formed into a pipe and then various evaluation tests were carried out. The results are shown in Table 2.

COMPARATIVE EXAMPLE 8

100 Parts by mass of a propylene-ethylene random copolymer (ethylene content: 1.0%, MFR: 0.5, Mw/Mn=13, crystallization temperature: 84° C.) and the same light stabilizer and antioxidant as those in Example 1 were blended and the mixture was kneaded and pelletized. A propylene-based resin composition having an MFR of 0.42 g/10 min. after kneading was formed into a pipe and then various evaluation tests were carried out. The results are shown in Table 2.

COMPARATIVE EXAMPLE 9

100 Parts by mass of a propylene-ethylene random copolymer (ethylene content: 3.0%, MFR: 0.5, Mw/Mn=4, crystallization temperature: 101° C.), 7.5 parts by mass of a hydrogenated styrene-butadiene-based rubber (Taftek N504 manufactured by Asahi Chemical Industries Co., Ltd., styrene content: 30%, weight average molecular weight: 230,000), 0.2 part by mass of tetrakis(1,2,2,6,6-pentemethyl-4-piperidyl)1,2,3,4-butanetetracarboxylate (Adekastab LA-52, manufactured by ADEKA CORPORATION, weight average molecular weight: 847) as a hindered-based light stabilizer and the same antioxidant as that in Example 1 were blended and the mixture was kneaded and pelletized. A propylene-based resin composition having an MFR of 0.42 g/10 min. after kneading was formed into a pipe and then various evaluation tests were carried out. The results are shown in Table 2.

TABLE 1

| | | Example 1 | Example 2 | Example 3 | Example 4 |
|---|---|---|---|---|---|
| Formulation (parts by mass) | Propylene-ethylene random copolymer (Ethylene: 3%, MFR: 0.5, Mw/Mn = 4) | 100 | 100 | 100 | 100 |
| | Propylene homopolymer (Ethylene: 0%, MFR: 0.5, Mw/Mn = 4) | — | — | — | 10.5 |
| | Styrene-butadiene-based rubber (weight average molecular weight: 230,000) | 7.5 | 6.7 | 8.2 | 8.4 |
| | Styrene-butadiene-based rubber (weight average molecular weight: 100,000) | — | — | — | — |
| | Hindered amine-based light stabilizer (weight average molecular weight: 847) | — | — | — | — |
| | Hindered amine-based light stabilizer (weight average molecular weight: 3,000) | 0.2 | 0.2 | 0.2 | 0.2 |
| | Phenol-based antioxidant | 0.1 | 0.1 | 0.1 | 0.1 |

TABLE 1-continued

|  |  | Example 1 | Example 2 | Example 3 | Example 4 |
|---|---|---|---|---|---|
|  | Phosphorus-based antioxidant | 0.2 | 0.2 | 0.2 | 0.2 |
|  | Sulfur-based antioxidant | 0.2 | 0.2 | 0.2 | 0.2 |
|  | Talc | — | 27.4 | 9.4 | — |
| Tensile strength | MPa | 25 | 28 | 26 | 26 |
| Tensile modulus of elasticity | MPa | 800 | 1600 | 1200 | 1100 |
| Izod impact strength | KJ/m$^2$ | 15 | 13 | 14 | 15 |
| 23 ± 1° C. (0 ± 1° C.) |  | (6) | (5) | (6) | (6) |
| High-temperature creep characteristics | hr | 3300 | 2000 | 2000 | 2000 |
| TOC elution amount | μg/m$^2$ · day | 5000 | 5000 | 5000 | 5000 |
| Weatherability, Tensile elongation | % | >500 | >500 | >500 | >500 |
| Inner surface roughness | μm | 2 | 3 | 3 | 3 |
| MFR after kneading | g/10 min | 0.43 | 0.42 | 0.42 | 0.42 |

TABLE 2

|  |  | Comparative Example 1 | Comparative Example 2 | Comparative Example 3 | Comparative Example 4 | Comparative Example 5 |
|---|---|---|---|---|---|---|
| Formulation (parts by mass) | Propylene homopolymer (Ethylene: 0%, MFR: 0.5, Mw/Mn = 4) | 100 | — | — | — | — |
|  | Propylene-ethylene random copolymer (Ethylene: 1%, MFR: 0.5, Mw/Mn = 13) | — | — | — | — | — |
|  | Propylene-ethylene random copolymer (Ethylene: 3%, MFR: 0.5, Mw/Mn = 2) | — | — | — | — | — |
|  | Propylene-ethylene random copolymer (Ethylene: 3%, MFR: 0.5, Mw/Mn = 4) | — | 100 | 100 | 100 | — |
|  | Propylene-ethylene random copolymer (Ethylene: 3%, MFR: 0.5, Mw/Mn = 9) | — | — | — | — | — |
|  | Propylene-ethylene random copolymer (Ethylene: 6%, MFR: 0.5, Mw/Mn = 4) | — | — | — | — | 100 |
|  | Styrene-butadiene-based rubber (weight average molecular weight: 230,000) | 7.5 | — | 20.5 | — | 7.5 |
|  | Styrene-butadiene-based rubber (weight average molecular weight: 100,000) | — | — | — | 7.5 | — |
|  | Hindered amine-based light stabilizer (weight average molecular weight: 847) | — | — | — | — | — |
|  | Hindered amine-based light stabilizer (weight average molecular weight: 3,000) | 0.2 | — | 0.2 | 0.2 | 0.2 |
|  | Phenol-based antioxidant | 0.1 | 0.1 | 0.1 | 0.1 | 0.1 |
|  | Phosphorus-based antioxidant | 0.2 | 0.2 | 0.2 | 0.2 | 0.2 |
|  | Sulfur-based antioxidant | 0.2 | 0.2 | 0.2 | 0.2 | 0.2 |
|  | Talc | — | — | — | — | — |
| Tensile strength | MPa | 30 | 29 | 19 | 25 | 23 |
| Tensile modulus of elasticity | MPa | 1200 | 950 | 550 | 800 | 600 |
| Izod impact strength | KJ/m$^2$ | 13 | 10 | 25 | 15 | 17 |
| 23 ± 1° C. (0 ± 1° C.) |  | (5) | (3) | (20) | (4) | (8) |
| High-temperature creep characteristics | hr | 1500 | 1300 | 1000 | 700 | 800 |
| TOC elution amount | μg/m$^2$ · day | 5000 | 6500 | 5000 | 5000 | 5000 |
| Weatherability, Tensile elongation | % | >500 | 300 | >500 | >500 | >500 |
| Inner surface roughness | μm | 5 | 5 | 1 | 2 | 2 |
| MFR after kneading | g/10 min | 0.44 | 0.54 | 0.29 | 0.56 | 0.42 |

|  |  | Comparative Example 6 | Comparative Example 7 | Comparative Example 8 | Comparative Example 9 |
|---|---|---|---|---|---|
| Formulation (parts by mass) | Propylene homopolymer (Ethylene: 0%, MFR: 0.5, Mw/Mn = 4) | — | — | — | — |
|  | Propylene-ethylene random copolymer (Ethylene: 1%, MFR: 0.5, Mw/Mn = 13) | — | — | 100 | — |
|  | Propylene-ethylene random copolymer (Ethylene: 3%, MFR: 0.5, Mw/Mn = 2) | — | 100 | — | — |
|  | Propylene-ethylene random copolymer (Ethylene: 3%, MFR: 0.5, Mw/Mn = 4) | — | — | — | 100 |
|  | Propylene-ethylene random copolymer (Ethylene: 3%, MFR: 0.5, Mw/Mn = 9) | 100 | — | — | — |
|  | Propylene-ethylene random copolymer (Ethylene: 6%, MFR: 0.5, Mw/Mn = 4) | — | — | — | — |
|  | Styrene-butadiene-based rubber (weight average molecular weight: 230,000) | 7.5 | 7.5 | — | 7.5 |
|  | Styrene-butadiene-based rubber (weight average molecular weight: 100,000) | — | — | — | — |
|  | Hindered amine-based light stabilizer (weight average molecular weight: 847) | — | — | — | 0.2 |

TABLE 2-continued

|  |  |  |  |  |  |
|---|---|---|---|---|---|
| | Hindered amine-based light stabilizer (weight average molecular weight: 3,000) | | 0.2 | 0.2 | 0.2 | — |
| | Phenol-based antioxidant | | 0.1 | 0.1 | 0.1 | 0.1 |
| | Phosphorus-based antioxidant | | 0.2 | 0.2 | 0.2 | 0.2 |
| | Sulfur-based antioxidant | | 0.2 | 0.2 | 0.2 | 0.2 |
| | Talc | | — | — | — | — |
| Tensile strength | | MPa | 24 | 25 | 24 | 25 |
| Tensile modulus of elasticity | | MPa | 800 | 900 | 700 | 800 |
| Izod impact strength 23 ± 1° C. (0 ± 1° C.) | | KJ/m² | 12 (4) | 13 (5) | 8 (2) | 15 (6) |
| High-temperature creep characteristics | | hr | 1500 | 1000 | 1000 | 2000 |
| TOC elution amount | | μg/m² · day | 7000 | 10000 | 8000 | 28000 |
| Weatherability, Tensile elongation | | % | >500 | >500 | >500 | >500 |
| Inner surface roughness | | μm | 2 | 30 or more | 4 | 2 |
| MFR after kneading | | g/10 min | 0.42 | 0.42 | 0.55 | 0.42 |

As is apparent from Table 1, since a propylene homopolymer having an ethylene content of 0% is used in Comparative Example 1 as compared with Example 1, the pipe of Comparative Example 1 showed about ½ of high-temperature creep characteristics of the pipe of Example 1. Also, since a propylene-ethylene random copolymer having an ethylene content of 6% is used in Comparative Example 5 when compared with Example 1, the ethylene content is too large, and thus the tensile strength and tensile modulus of elasticity decreases and the pipe of Comparative Example 5 showed about ¼ of high-temperature creep characteristics of the pipe of Example 1. Consequently, the propylene-ethylene random copolymer (A) displays good tensile strength and high-temperature creep characteristics since the ethylene content is within a range from 2 to 5%.

Since the styrene-butadiene-based rubber (B) is not blended in Comparative Example 2 when compared with Example 1, high-temperature creep characteristics decreased to less than ½ of those of Example 1, the impact strength decreased to ⅔ of that of Example 1, and the inner surface roughness was 2.5 times that of Example 1. Furthermore, since the light stabilizer is not blended, weatherability decreased to less than ⅗ of that of Example 1. Since the amount of the styrene-butadiene-based rubber (B) is too large (20.5 parts by mass) in Comparative Example 3 when compared with Example 1, the tensile strength and tensile modulus of elasticity decreased and high-temperature creep characteristics decreased to less than ⅓ of those of Example 1. When the amount of the styrene-butadiene-based rubber (B) is large, the effect of decreasing MFR after kneading and the effect of improving the inner surface smoothness are obtained. Since the numerical value of Example 1 is sufficiently within an allowable range, it is necessary that the amount of the styrene-butadiene-based rubber (B) is from 1 to 15 parts by mass based on 100 parts by mass of the propylene-ethylene random copolymer (A) for application as high-temperature piping members.

Since the weight average molecular weight of the styrene-butadiene-based rubber of Example 1 is 230,000, whereas, the styrene-butadiene-based rubber of Comparative Example 4 is a small value of 100,000, high-temperature creep characteristics considerably decrease to ⅕ of those of Example 1. Consequently, when the weight average molecular weight of the styrene-butadiene-based rubber (B) is 200,000 or more, the effect of remarkably improving high-temperature creep characteristics of the piping member formed of the propylene-based resin composition.

Since the propylene-ethylene random copolymer of Comparative Example 6 has a wide Mw/Mn value of 9 and contains a large amount of low molecular weight components when compared with Example 1, the TOC elution amount is 1.4 times as that of Example 1.

Since the propylene-ethylene random copolymer of Comparative Example 7 has a narrow Mw/Mn value of 2 when compared with Example 1, it is difficult to form a pipe having a smooth inner surface by extrusion molding, and thus the inner surface roughness is 30 or more. The TOC elution amount must decrease originally since the amount of the low molecular weight component is small. However, the surface area increased since the inner surface is not smooth, and thus the surface area is actually 2.0 times that of Example 1.

Furthermore, since the propylene-ethylene random copolymer having an ethylene content of 1% of Comparative Example 8 has a wide Mw/Mn value of 13 and contains a large amount of low molecular weight components when compared with Example 1, the TOC elution amount is 1.6 times that of Example 1. When comparing with Comparative Examples 2 and 6 in which a styrene-butadiene-based rubber is not blended, deterioration of the Izod impact strength and high-temperature creep characteristics is caused by the low molecular weight component.

Since the weight average molecular weight of a hindered amine-based light stabilizer is less than 2,000 in Comparative Example 9 when compared with Example 1, the hindered amine-based light stabilizer became a low molecular weight component and the TOC elution amount was large. Weathering characteristics can be improved without increasing the TOC elution amount by blending a hindered amine-based light stabilizer (C) having a weight average molecular weight of 2,000 or more in the amount of 0.1 to 1.9 parts by weight based on 100 parts by mass of a propylene-ethylene random copolymer (A).

In Example 2, talc is blended as an inorganic filler and thus nearly the same characteristics as those of Example 1 were obtained. When talc is blended, elongation in a longitudinal direction caused by heat expansion of a piping member can be suppressed, and also meandering of the pipe caused by heat expansion can be suppressed by allowing a high-temperature fluid to flow when the piping member is a pipe. When comparing Example 2 with Example 3, since the amount of talc decreases like Example 3, heat expansion can not be sufficiently suppressed and rigidity deteriorates, and thus the tensile strength and tensile modulus of elasticity slightly decrease when compared with Example 2. In order to sufficiently exert the effect of blending talc, it is preferred to blend talc in the amount of 10 parts by mass or more based on 100 parts by mass of the propylene-ethylene random copolymer (A). When talc is further added in Example 2, rigidity increases and the Izod impact value decreases, and thus it is preferable to blend talc in the amount of 30 parts by mass or less based on 100 parts by mass of the propylene-ethylene random copolymer (A). Consequently, when talc is blended, the amount is preferably from 10 to 30 parts by mass based on 100 parts by mass of the propylene-ethylene random copolymer (A).

In Example 4, a propylene homopolymer as another polymer component is blended in the case of Example 1. When comparing Example 4 with Example 1, an improvement in tensile modulus of elasticity is recognized. When it is intended to further improve physical properties of the pipe of Example 1, another polymer can also be blended if the amount is the same as or less than that of the styrene-butadiene-based rubber (B) based on 100 parts by mass of the propylene-ethylene random copolymer (A).

As described above, a piping member made of a propylene-based resin containing a propylene-ethylene random copolymer (A) and a styrene-butadiene-based rubber (B) as essential components of the present invention has excellent high-temperature creep characteristics and therefore can withstand the operation of allowing fluid flow at a high temperature of 95° C. Low-temperature brittleness is suppressed because of good Izod impact strength at a low temperature, and thus piping does not deteriorate or fracture even if the fluid is frozen. Thus the piping member can be used at a low temperature of up to −20° C. Therefore, the piping member made of the propylene-based resin of the present invention can be used. Since the TOC elution amount is suppressed and weatherability is improved by blending a hindered amine-based light stabilizer having a weight average molecular weight of 2,000 or more, the piping member is suited for use in a piping line for supplying pure water or a chemical solution in the fields of food, medical care and semiconductor manufacturing where avoidance of elution to a fluid from the piping member is required.

Although the piping member made of the propylene-based resin obtained by extrusion molding is used in the present example, a similar effect is obtained in other piping members such as multi-layered pipes obtained by extrusion molding, and joints, flanges and casings of actuators obtained by injection molding.

The invention claimed is:

1. A piping member formed by using a propylene-based resin composition, comprising 100 parts by mass of a propylene-ethylene random copolymer (A) having an ethylene content of 2 to 5% by weight, a crystallization temperature of 86 to 105° C., a melt flow rate of 0.01 to 2.00 g/10 min and a molecular weight distribution of 3 to 8, and 1 to 15 parts by mass of a styrene-butadiene-based rubber (B) having a styrene content of 10 to 40% by weight and a weight average molecular weight of 200,000 or more as essential components, and a melt flow rate after kneading being from 0.01 to 2.00 g/10 min, wherein the propylene-based resin composition further comprises a hindered amine-based light stabilizer (C) having a weight average molecular weight of 2,000 or more in the amount of 0.1 to 1.0 parts by mass based on 100 parts by mass of the propylene-ethylene random copolymer.

2. The piping member formed by using a propylene-based resin composition according to claim 1, wherein the styrene-butadiene-based rubber is a hydrogenated styrene-butadiene block copolymer rubber.

* * * * *